July 23, 1940.   R. B. PIERSON   2,208,774
METHOD OF AND APPARATUS FOR PRODUCING MEASURED LENGTHS OF CLOTH
Filed Nov. 30, 1938   4 Sheets-Sheet 3
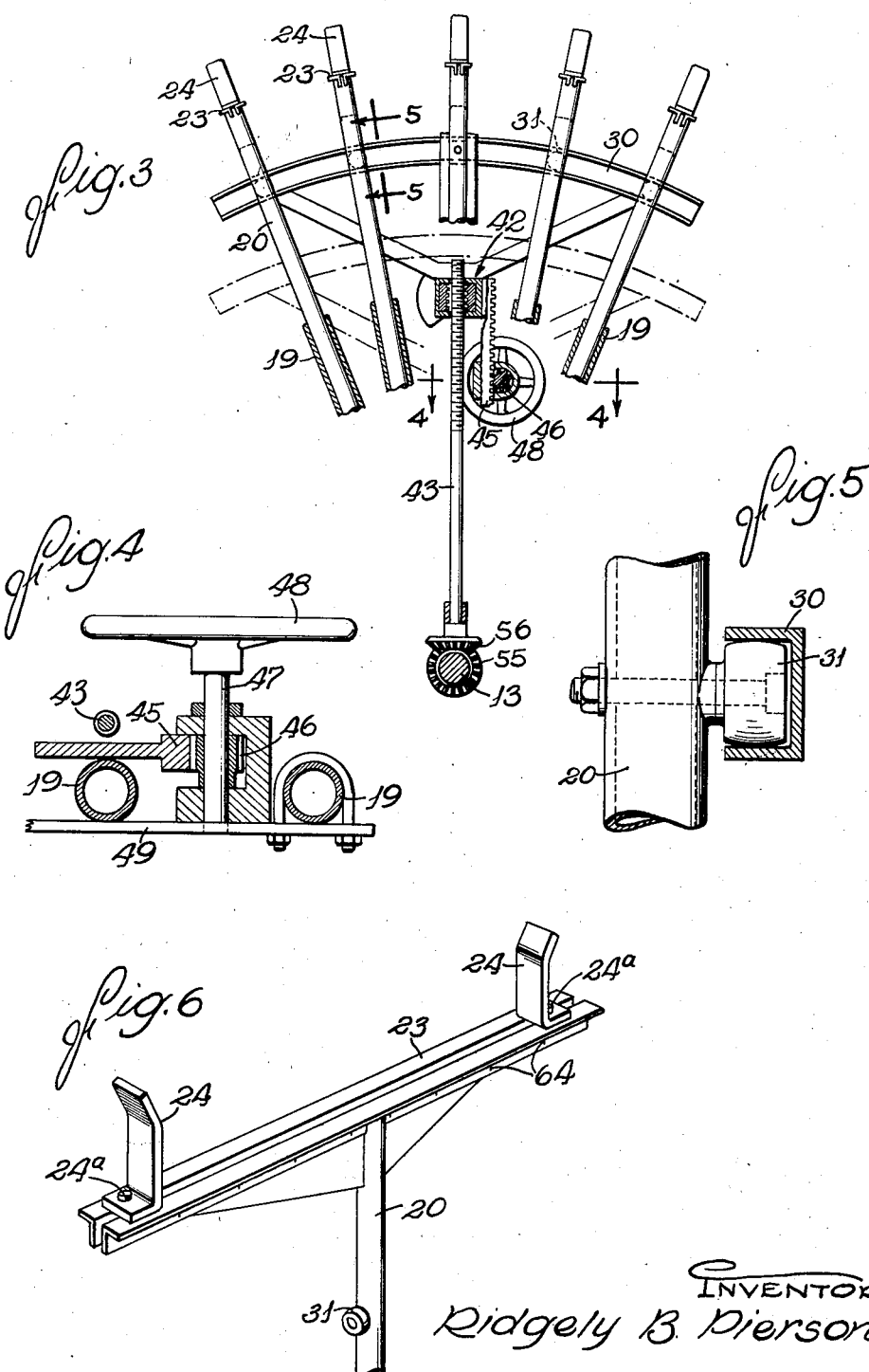

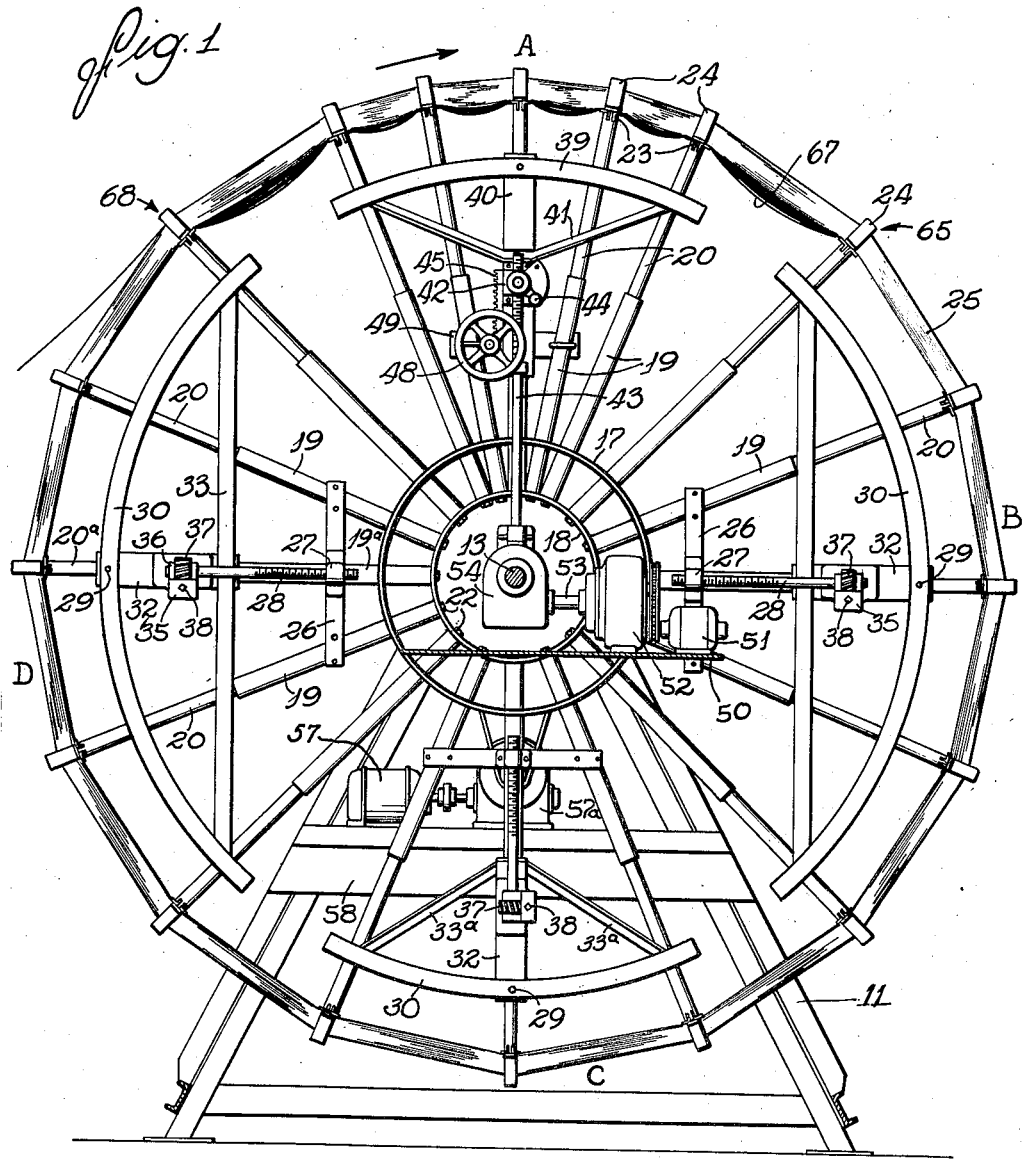

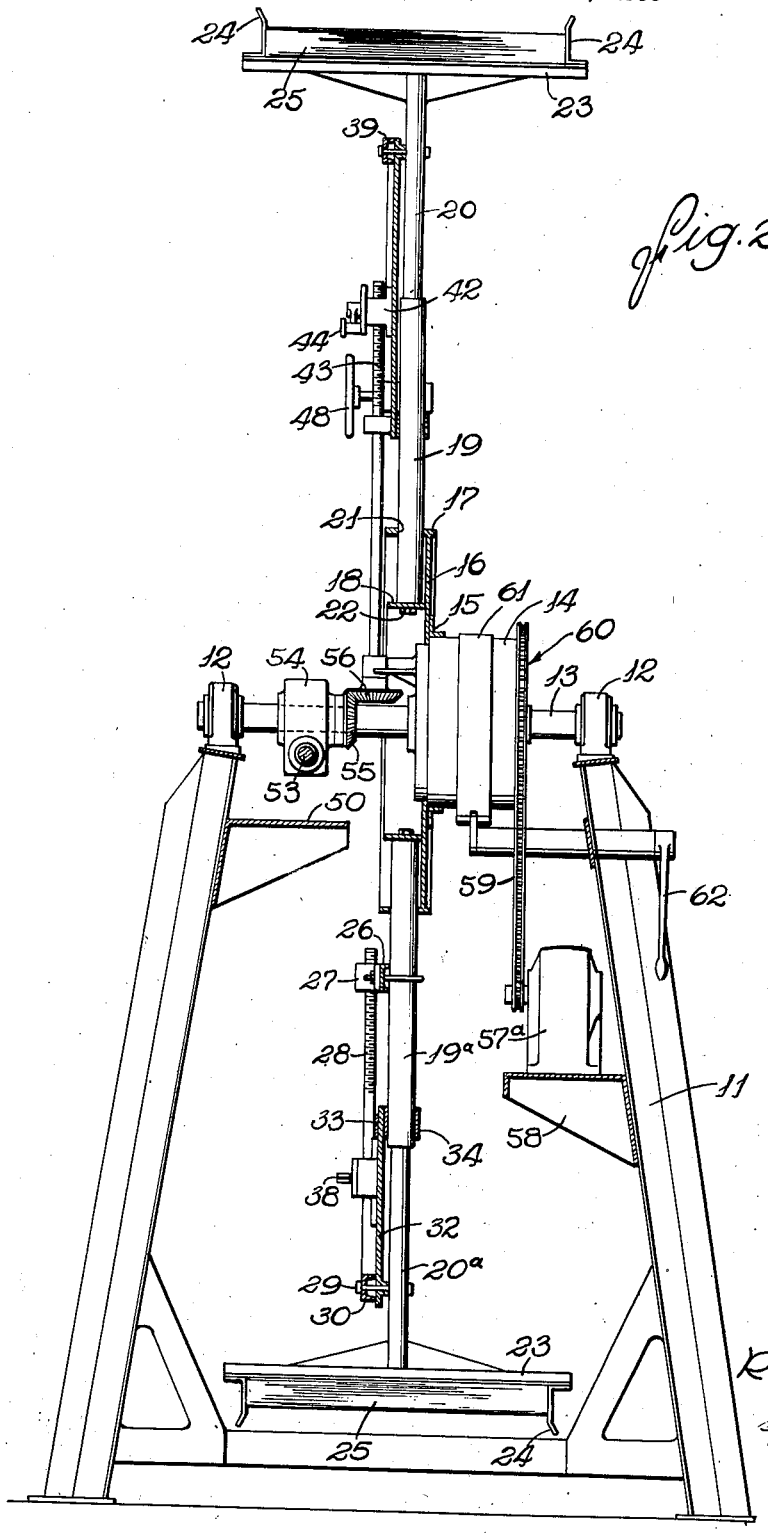

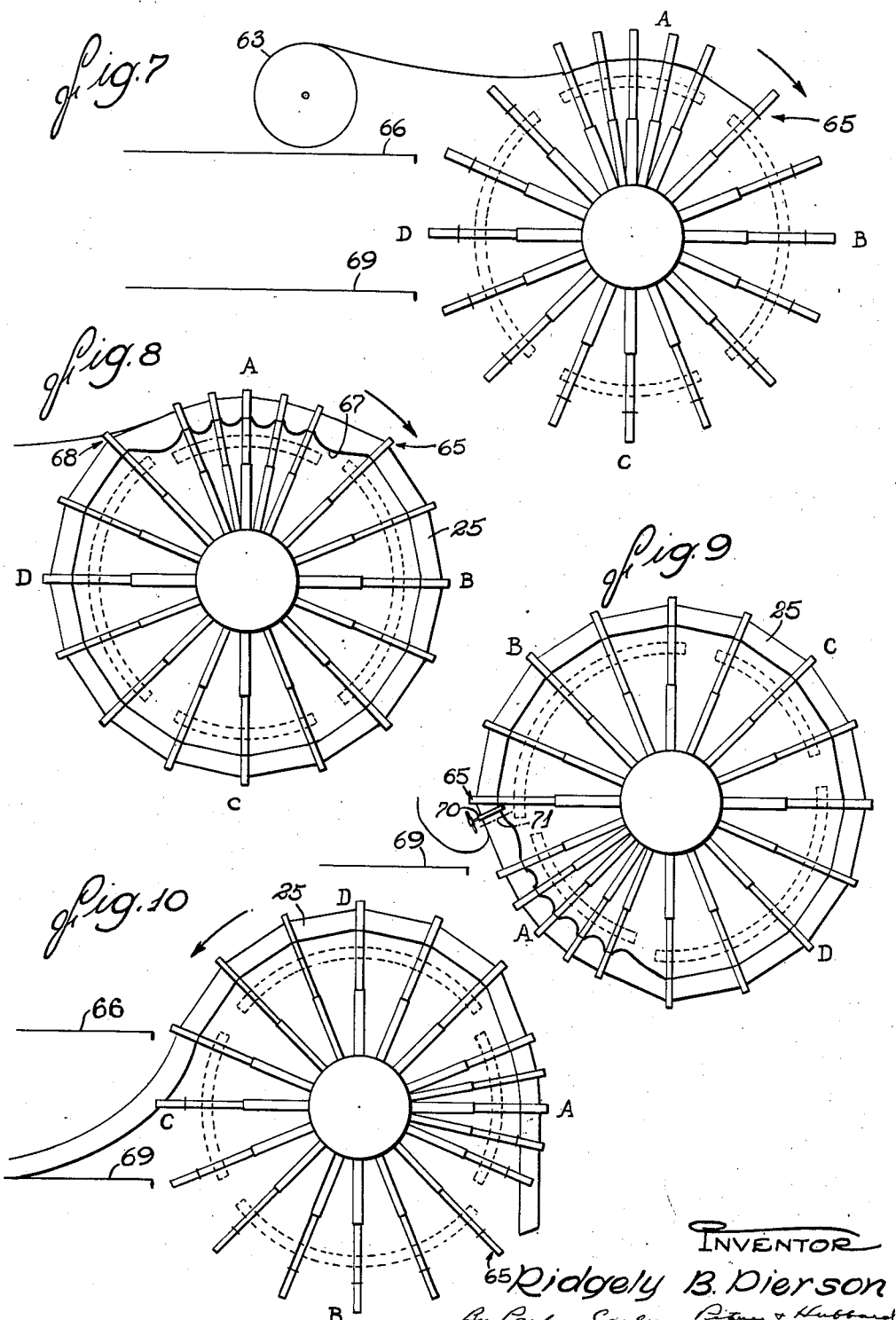

Patented July 23, 1940

2,208,774

UNITED STATES PATENT OFFICE 2,208,774

METHOD OF AND APPARATUS FOR PRODUCING MEASURED LENGTHS OF CLOTH

Ridgely B. Pierson, Quincy, Ill.

Application November 30, 1938, Serial No. 243,084

5 Claims. (Cl. 33—129)

The invention relates to a method of and apparatus for producing measured lengths of cloth and the general aim is to provide a new and improved method of and apparatus for rapidly, efficiently and accurately measuring a large number of lengths of cloth to a given dimension while arranging the lengths in an even pile or stack. This application is a continuation in part of my copending application Serial No. 199,907 filed April 4, 1938, now abandoned.

In fabricating articles of cloth on a large scale, as for example in the manufacture of shirts, dresses or the like it is common practice to arrange the patterns of the individual pieces of the articles to be made so that said pieces may be cut with minimum waste from a piece of cloth. This arrangement or a multiple of such an arrangement determines the minimum length of the piece from which the pattern pieces are formed. The cloth is then cut to such length and a large number of the lengths are piled or stacked evenly so that the pattern pieces may each be cut in a single operation from many cloth lengths. Heretofore it has been difficult to measure and cut the cloth to proper lengths rapidly and with accurate uniformity, as well as to stack the cloth lengths with even margins and without wrinkles. These represent critical factors since excess length is wasted material while wrinkles may result in spoiled or inaccurate pattern pieces.

An object of the invention is to provide a novel method of accurately and uniformly producing measured lengths of cloth in piles or stacks having even margins and in which the individual lengths are in a smooth, unwrinkled condition.

Another object is to provide a novel method of producing lengths of cloth which includes forming a strip of cloth continuously into a loop while maintaining the circumference of each ply or lap constant to a predetermined measurement, causing the fullness which develops in the inner plies to accumulate along one short section of the loop, securing the plies together, cutting the loop at a point adjacent to the accumulated fullness, and straightening the loop while removing the fullness from the loose end portion of the pile.

It is another object of the invention to provide a new and improved apparatus of the character described which embodies novel means for accurately measuring cloth to uniform lengths.

More specifically stated, a further object is to provide in such apparatus new and improved means for forming a strip of cloth into a loop comprising a plurality of plies of cloth each having the same predetermined length and accumulating the fullness which develops in the inner plies at one place so that when the loop is severed to form strips, the fullness will be located at one end of the pile of strips and may be easily, quickly and entirely removed to produce an even pile.

Another object is to provide novel means for adjusting the apparatus to predetermined length measurements and for maintaining the measurement constant for each successive ply of cloth.

Other objects and advantages will become apparent in the following description and from the accompanying drawings, in which:

Figure 1 is a side elevation of apparatus embodying the features of the invention.

Fig. 2 is a view through the apparatus generally in vertical axial section.

Fig. 3 is a fragmentary view partially in elevation and partially in section showing details of construction of the variably movable section of the reel.

Figs. 4 and 5 are sectional views on an enlarged scale and are taken respectively along the lines 4—4 and 5—5 of Fig. 3.

Fig. 6 is a fragmentary view in perspective illustrating the cloth supporting cross member to which the starting end of the cloth is attached.

Figs. 7, 8, 9 and 10 show diagrammatically successive steps of the method.

In practicing the novel process according to the present invention, it is convenient to wind the cloth, taken as a web from a large source of supply, into the form of a loop on a sizable frame in the nature of a rotatable wheel or reel having cloth supporting means thereon, the circumferential length of which is equal to the desired length measurement of the cloth pieces. As an example of an operative condition, the circumference may be on the order of ten to seventeen yards and approximately one hundred and fifty plies of cloth (to produce that number of pieces) may be wound on the frame. Since in the winding operation the circumferential length will normally increase each turn or revolution a distance determined by the thickness of a ply of the cloth, the supporting means is retracted radially to compensate for the normal increase. This operation, while insuring that each ply will be exactly the same length as every other ply, results in a diminution of the circumferential length of the support for the inner plies and causes them to become increasingly loose. In other words, what may be termed "fullness" is produced in the inner plies.

Where cloth is the material being measured, this fullness introduces a serious difficulty since it tends to occur throughout the entire length of the loop. With some materials, such as paper, the evenly distributed fullness may be easily smoothed out after the loop is severed since paper is relatively smooth, frictionless and not apt to form small folds and wrinkles. On the other hand, the rough, flexible nature of cloth prevents ready elimination of the fullness from the length of a stack or pile of pieces.

This difficulty is overcome by causing the fullness to accumulate along one relatively short section or portion of the loop length while substantially eliminating fullness from the remaining portion of the loop. When the winding operation is complete, the many plies are clamped together at a point adjacent to the accumulated fullness, the loop is severed along a transverse line between the clamping means and the fullness and the pile of pieces withdrawn from the frame to a cutting table or the like. The fullness is thereby confined to the loose end portion of the pile and may be quickly and conveniently removed without difficulty. The resulting pile will comprise a marginally even stack of pieces of uniform length.

Referring to the drawings, the cloth measuring apparatus, which has been shown for illustrative purposes, comprises the following arrangement of parts. An upright supporting frame 11 (Figs. 1 and 2) supports a pair of bearings 12 for a horizontally disposed axle 13. Affixed concentrically on the axle is an enlarged drum 14, one side face of which is located approximately midway of the ends of the axle. Secured, as by brackets 15, to this face of the drum is a radially extending plate 16 which carries a pair of spaced concentric flanges 17 and 18. The drum, plate and flange assembly comprise a hub structure for supporting a plurality of members arranged to provide a wheel or reel upon which a web of cloth may be wound.

In the present instance, the cloth supporting members are in the form of a plurality of radially extending spokes. Each spoke comprises an inner and an outer tubular member 19 and 20, respectively, the outer member being telescopically related to the inner member. The inner member extends through an appropriately formed aperture 21 (Fig. 2) in the outer flange 17 and seats against the outer surface of the inner flange 18 in which position it is secured by such means as a threaded stem extending through the inner flange for engagement by a securing nut 22. This arrangement holds the inner member rigidly in radially extending position. Each outer spoke member 20 carries, at its outer end, a transversely extending cross arm 23 which parallels the axis of the axle 13 and has spaced outstanding fingers 24 thereon defining with the cross arm a channel for the reception of the turns or plies of cloth, designated 25, as they are wound on the reel. The fingers 24 are preferably adjustable longitudinally of the transverse arm 23 as, in this instance, by forming the arm from a pair of angle members arranged to define a longitudinal slot for the reception of a bolt 24ª carried by the fingers 24.

As may be seen in Fig. 1, the circular series of cross arms 23 (Figs. 1 and 6) define the periphery of the reel and the circumferential dimension determines the length measurement of a piece of cloth. It is preferred that the apparatus embody means for adjusting this dimension. To this end, the reel is divided into sections and the outer spoke members 20 in each section are connected for conjoint radial movement. Four such sections are designated A, B, C and D in Fig. 1, and, since these sections, with the exception of section A, are alike, a description of the structure of one section will suffice for the other sections. Referring to the section D in Fig. 1, a bracket 26 is rigidly secured to the inner spoke members 19 of a pair of the spokes in that section. The bracket carries a nut 27 having a radial screw threaded bore for engagement by a screw 28 which extends outwardly of the reel preferably along the intermediate spoke in the section D, the members of which spoke are specially designated 19ª and 20ª. Affixed to the outer spoke member 20ª, as by a screw 29, is an arcuate channel member 30, the open face of which is in opposition to the outer members of the other spokes in the section D. The arcuate member 30 is concentric with the axis of the axle and each of the outer spoke members, with the exception of the member 20ª, supports an antifriction roller 31 (Fig. 5) engaging said channel.

Also secured by the screw 29, between the channel member and the intermediate outer spoke member 20ª, is a plate 32 disposed to extend radially inwardly from the arcuate member. Near its inner end, the plate is connected with a transverse reenforcing bar 33 which in sections B and D extends as a cord between the end portions of the arcuate member and in section C extends angularly, as at 33ª, to connect with the end portions of the associated arcuate member. The plate 32 also carries a bushing 34 (Fig. 2) which slidably encircles the end portion of the inner spoke member 19ª. The plate 32 supports a gear box 35 having spaced bearings 36 for the unthreaded end of the screw 28. This end carries a helical gear 37, or the like, between the bearings for meshed engagement with a second gear (not shown) but arranged for manual actuation by a shaft 38 projecting from the gear box. It will be evident that conjoint radial adjustment of the cross arms in any section may be easily and conveniently made by rotation of the shaft 38.

The cross arms of the section A are also arranged for manual adjustment radially, and the structure includes an arcuate channel member 39, similar to the channel member 30, a plate 40, similar to the plate 32, and a transverse reenforcing bar 41, similar to the bar 33ª in section C. The section A covers a comparatively small portion of the total circumferential length and has associated therewith means for progressively moving the cross arms of the section radially inwardly as the reel rotates, whereby to compensate for the increased length of the circumferential dimension resulting from the added plies of cloth. In the illustrated construction, the plate carries a nut assembly 42 for engagement with the screw threaded end of a shaft 43. The nut assembly 42 is a conventionally well-known type of split-nut structure operable by the hand lever 44 to connect the nut with or release it from the shaft. Secured to the nut assembly is a rack 45 (Figs. 1 and 3) disposed to extend parallel with the plate for engagement by a pinion 46 on the shaft 47 of a handwheel 48. The pinion, shaft and handwheel assembly are mounted on a bracket 49 which is similar to the bracket 26 on the section D. Radial adjustment of the cross arms in the section A is manually effected by releasing the nut assembly from its engagement with the screw threads of the shaft 43 and then manipulating the handwheel to move the cross arms to a desired position.

The means for progressively retracting the cross arms in the section A as the reel is rotated comprises means for driving the shaft 43 at a rate of speed which will, through the engagement of the shaft with the nut 42, retract the cross arms of the section A a compensating distance upon each rotation of the reel. As illustrated, the supporting frame 11 carries a horizontal platform 50 which supports a driving electric motor 51 (Fig. 1). The motor drives a change speed gear mechanism housed in the casing 52. The power output shaft 53 leads to a gear box 54 supported on the axle 13. A hub having a bevel gear 55 located externally of the gear box 54 loosely encircles the axle 13 and is driven from the shaft 53 through gears housed within the gear box 54. The axle 13 is rotatable relative to the gear box 54 and bevel gear 55. A bevel gear 56, secured to the inner end of the shaft 43, meshes with the bevel gear 55. The change speed gear mechanism is preferably of a conventional type which permits adjustment of the speed of rotation of the shaft 43 by infinitesimal increments so that the rate at which the cross arms of the section A are moved radially inwardly may be acurately predetermined. In operation, this rate of inward movement of these arms is adjusted to compensate for the increase in circumferential length of the cloth resulting primarily from the progressive increase of the diameter of the reel as the successive plies of cloth are wound thereon. The rate of inward movement for each revolution of the reel will, therefore, be determined primarily by the thickness dimension of the cloth.

The reel may be driven in any suitable manner as by an electric motor 57 and speed reduction mechanism 57a mounted on a platform 58 on the frame 11 and drivingly connected by a chain 59 with a sprocket 60 carried by the drum 14. The drum may, if desired, serve as a part of a brake mechanism which includes a brake band 61 encircling the drum and actuated by a brake lever 62.

To condition the apparatus for operation the several sections are manually adjusted so that the circumferential distance defined by the cross arms on the spokes is equal to the desired length measurement of the cloth pieces. The end of a web of cloth from a conventional supply source, diagrammatically represented by the circular member 63, is suitably fixed to one of the cross arms, as for example by means of a series of pins 64 (Fig. 6). It is preferred that the cross arm, to which the end of the cloth web is attached, is the arm which is immediately in advance of the progressively retractible section A. With reference to Fig. 7, this arm is designated by the numeral 65 as being the arm which precedes the section A when the direction of rotation of the reel is clockwise. The supply of cloth is suitably supported on a feed table, diagrammatically represented at 66, and during the rotation of the reel the cloth is fed under substantially uniform tension by an operator onto the periphery of the reel. As the number of plies of cloth increase, the section A is moved inwardly to maintain the outer circumference that receives each new cloth ply constant to the predetermined length dimension. It may be mentioned that the positive retraction of the section A by an independent drive is important when cloth is being wound on the reel since the tendency of the cloth to stretch makes it impossible to retract the section by any force, such as a constricting one, exerted through or by the cloth.

The diminution of the circumference defined by the cross arms produces a looseness or fullness designated 67 (Fig. 8) in the inner plies of the cloth which, in the present instance, will accumulate only in that section of the reel spanned by the retractible section A; in other words, the fullness will accumulate between the starting cross arm 65 and the cross arm designated 68 (Fig. 8) immediately adjacent to the other side of the section A. The cloth through the remaining portion of the reel remains taut during the operation of winding the cloth on the reel. As soon as the required number of plies have been wound, the reel is stopped and preferably turned, as shown in Fig. 9, to a position opposite a cutting table, diagrammatically designated 69. The operator then clamps the laps of cloth firmly together, by such means as hand clamps 70, the point of clamping preferably being immediately adjacent to the starting arm 65 and at the end of the section occupied by the accumulated fullness. The cloth plies are severed transversely, as along the dotted line 71, and the pieces withdrawn from the reel onto the cutting table as indicated in Fig. 10. In this manner, the accumulation of fullness is confined to the trailing or loose end portion of the pile of cloth pieces and there is a tendency toward elimination of a certain amount of the fullness as the loose ends swing free during the removal of the pieces from the reel. Subsequently, the pile on the cutting table is smoothed by hand and, since substantially all fullness is located at the loose end of the pile, complete removal thereof may be easily and quickly accomplished. The resulting pile is made up of a large number of evenly arranged, unwrinkled pieces of uniform length, and the pile is in proper condition for further treatment.

While the invention is susceptible of various modifications and alternative constructions, I have shown in the drawings and have herein described in detail the preferred embodiment, but it is to be understood that I do not thereby intend to limit the invention to the specific form disclosed, but intend to cover all modifications and alternative constructions falling within the spirit and scope of the invention as expressed in the appended claims.

I claim as my invention:

1. Apparatus for measuring cloth or the like to uniform lengths comprising the combination of a rotatable frame having cloth supporting means thereon to receive a continuous web of cloth and wind it on the frame during rotation thereof, means mounting one section of said supporting means of substantially less circumferential extent than the whole for radial movement, means automatically operable as the frame rotates for moving said section progressively inwardly at a rate which compensates for that increase in the circumferential dimension of said supporting means resulting from the previously wound ply of cloth, and means for varying said rate in accordance with the thickness dimension of the cloth to be wound.

2. Apparatus for measuring cloth or the like to uniform lengths comprising the combination of a rotatable frame having cloth supporting means thereon to receive a continuous web of cloth and wind it on the frame during rotation thereof, said supporting means comprising a plurality of circumferential sections separately mounted for radial movement, means for adjusting each of said sections to obtain a desired circumferential dimension, and means operated automatically for moving only one section radially inwardly as the frame rotates and the cloth is wound thereby to maintain said dimension constant.

3. Apparatus for measuring cloth or the like to uniform lengths comprising the combination of a rotatable frame including a plurality of radially extending and radially shiftable members, and a transversely extending cloth support on each of said members, means connecting said members in groups of adjacent members for conjoint radial movement, means for fixing the positions of all but one of said groups relative to the axis of said frame, means for driving said frame rotatably, and means for moving the unfixed one of said groups radially inwardly as the frame rotates.

4. The method of measuring a web of cloth or like material to produce a plurality of pieces of uniform length which includes the steps of winding the material continuously into the form of a loop while maintaining constant the circumferential length of the outer ply with resulting diametrical constriction of the inner plies and while accumulating the circumferential fullness of the inner plies resulting from such constriction within a limited circumferential portion of the loop, severing all of the plies by cutting across the loop along a line located at one side of the accumulated fullness, and holding the ends of the plies across one end of the opened loop in even registration while extending the opened loop to a flat plane and smoothing the accumulated fullness from the opposite end of the opened loop.

5. Apparatus for measuring lengths of cloth or the like comprising the combination of a rotatably driven frame having supporting means for a web of cloth being continuously wound on said frame, means for radially retracting a section of said supporting means to compensate for the increase in circumferential length of said supporting means which would otherwise result from each added layer of cloth, the fullness of the inner layers of cloth being accumulated along the length of the retracting section, means for securing the starting end of the web to the frame at one side of the retracting section, and means for clamping the layers of cloth together at a point adjacent to said securing means to define one limit of said accumulated fullness and indicate a proper line of severance of the cloth layers to locate the fullness at the unclamped ends of the pile of cloth pieces after severance.

RIDGELY B. PIERSON.